United States Patent
Ball

(10) Patent No.: US 6,707,283 B1
(45) Date of Patent: *Mar. 16, 2004

(54) PRIMARY SIDE SENSING CIRCUIT FOR PRODUCING A SECONDARY SIDE CONSTANT CURRENT, CONSTANT VOLTAGE OUTPUT

(75) Inventor: Alan R. Ball, Gilbert, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 382 days.

This patent is subject to a terminal disclaimer.

(21) Appl. No.: 09/608,928

(22) Filed: Jul. 3, 2000

(51) Int. Cl.$^7$ ................................................. G05F 1/56
(52) U.S. Cl. ..................... 323/284; 323/285; 363/21.04; 363/21.11; 363/97
(58) Field of Search ................................ 323/284, 285, 323/313; 363/21.04, 21.09, 21.11, 97

(56) References Cited

U.S. PATENT DOCUMENTS 5,305,192 A * 4/1994 Bonte et al. ................ 323/285
5,349,284 A * 9/1994 Whittle ....................... 323/285
5,619,405 A * 4/1997 Kammiller et al. ........... 363/80
6,333,624 B1 * 12/2001 Ball et al. .................... 323/284

* cited by examiner

Primary Examiner—Jeffrey Sterrett

(57) ABSTRACT

A switching power supply (30) includes a compensation circuit (58) which monitors a transformers (36) primary side to provide a voltage compensation signal, $COMP_V$. A transistor inductor current, $V_{TRAN}$ is fed to the compensation circuit (58) to establish a DC level proportional to the peak primary side inductor current flowing through a power transistor (38). $V_{TRAN}$ is fed to a multiplier circuit (98). The output of the multiplier circuit (98) is scaled by a resistor (80) to establish the compensation signal, $COMP_V$ at the output to the compensation circuit (58). When at current limit, an amplifier (66) becomes saturated causing a diode (68) to reverse bias, effectively removing compensation signal $COMP_V$ from operation. An amplifier (70) falls into a linear region and a diode (74) becomes forward bias forcing compensation signal $COMP_C$ into operation providing regulation to the output of the switching power supply (30) at current limit.

20 Claims, 3 Drawing Sheets

PRIMARY SIDE SENSING CIRCUIT FOR PRODUCING A SECONDARY SIDE CONSTANT CURRENT, CONSTANT VOLTAGE OUTPUT

BACKGROUND OF THE INVENTION

The present invention relates in general to electronic circuits and, more particularly, to switching power supplies which converts an AC signal to a regulated DC signal.

Most switching power supplies have a transformer with a power switching transistor coupled to one side of the transformers primary winding. The power transistor turns on and off as determined by a regulator circuit to alternately store energy in the magnetic field of the transformer and transfer the stored energy to the secondary winding. The secondary winding of the transformer develops a DC output voltage across a shunt capacitor coupled across the secondary winding as a function of the energy transfer.

For example, FIG. 1 illustrates prior art switching power supply 10 that receives an AC line voltage and converts it to a DC bulk voltage by the full-wave rectifier diode bridge 12. Capacitor 14 filters the DC bulk voltage, and the primary winding of transformer 16 receives the DC bulk voltage. Regulator 18 modulates an inductor current through the primary winding of transformer 16 to control the amount of energy stored in the magnetic field of transformer 16. The energy stored in the magnetic field is transferred to the secondary winding where capacitor 20 is coupled across the secondary winding to develop the DC output voltage ($V_{OUT}$). Diode 22 and photo-detection transistor 24 act together to optically couple feedback information from reference and error amplifier 26 to regulator circuit 18 to regulate $V_{OUT}$ of switching power supply 10.

Secondary side sensing of the voltage and current at the output to the switching power supply in the prior art requires at a minimum, a voltage reference, additional op amps, an opto-coupler, as well as a secondary supply voltage which operates at current limit. When at current limit, the output voltage typically is reduced which results in a reduction of the output voltage to operate the constant current circuitry. Thus, it is desired to have a switching power supply circuit that works entirely from the primary side of the transformer to eliminate the need for additional components. Also, a need exist as well to eliminate the secondary side supply required to operate a switching power supply while in current limit. Furthermore, a need exists to have a switching power supply circuit that operates in a constant current mode, and a constant voltage mode at the output to the switching power supply. The invention disclosed herein will address the above problems.

DETAILED DESCRIPTION OF THE PREFERED EMBODIMENT

Figure 1:
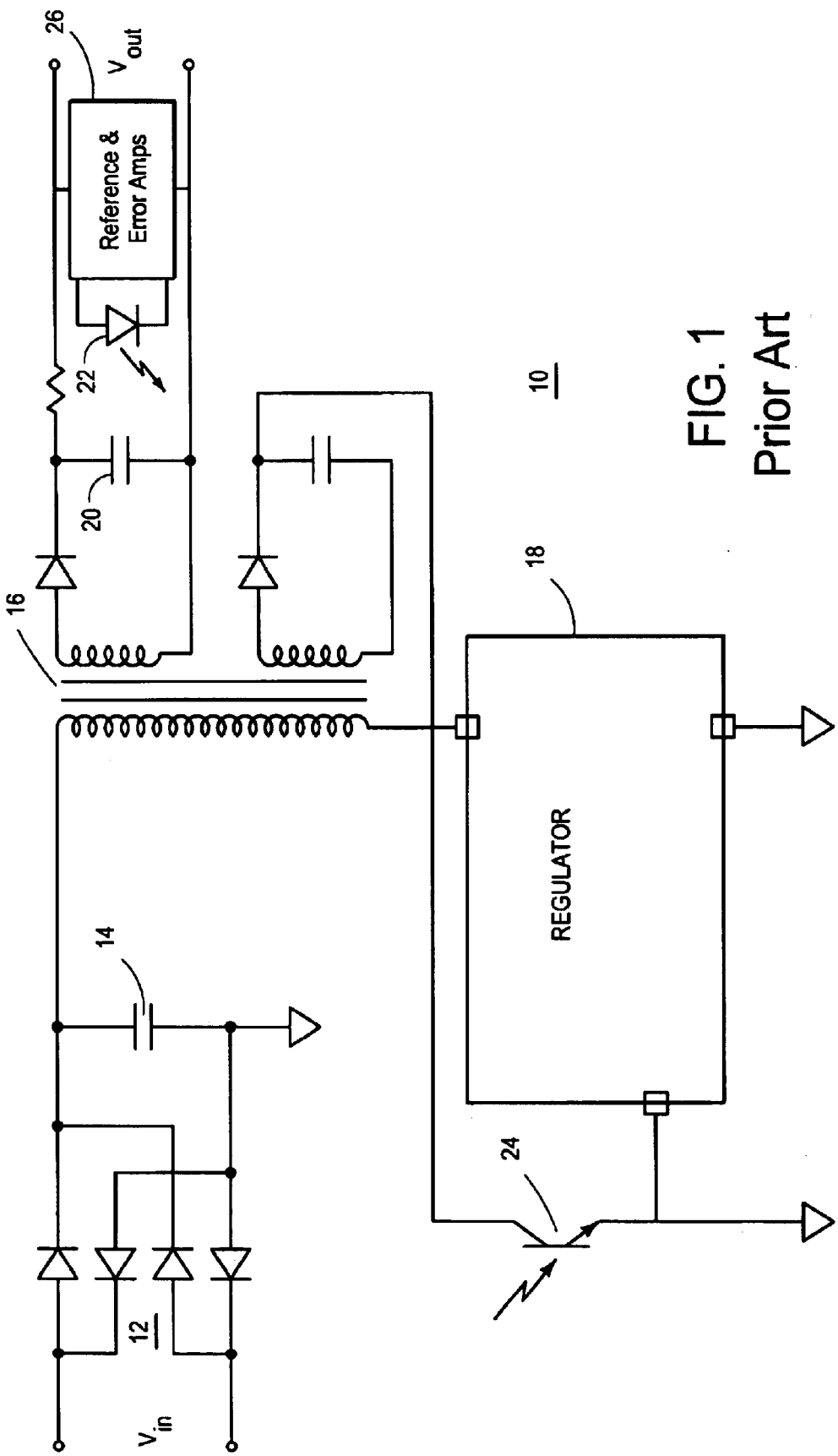
FIG. 1 is a schematic diagram of a prior art switching power supply.
Figure 2:
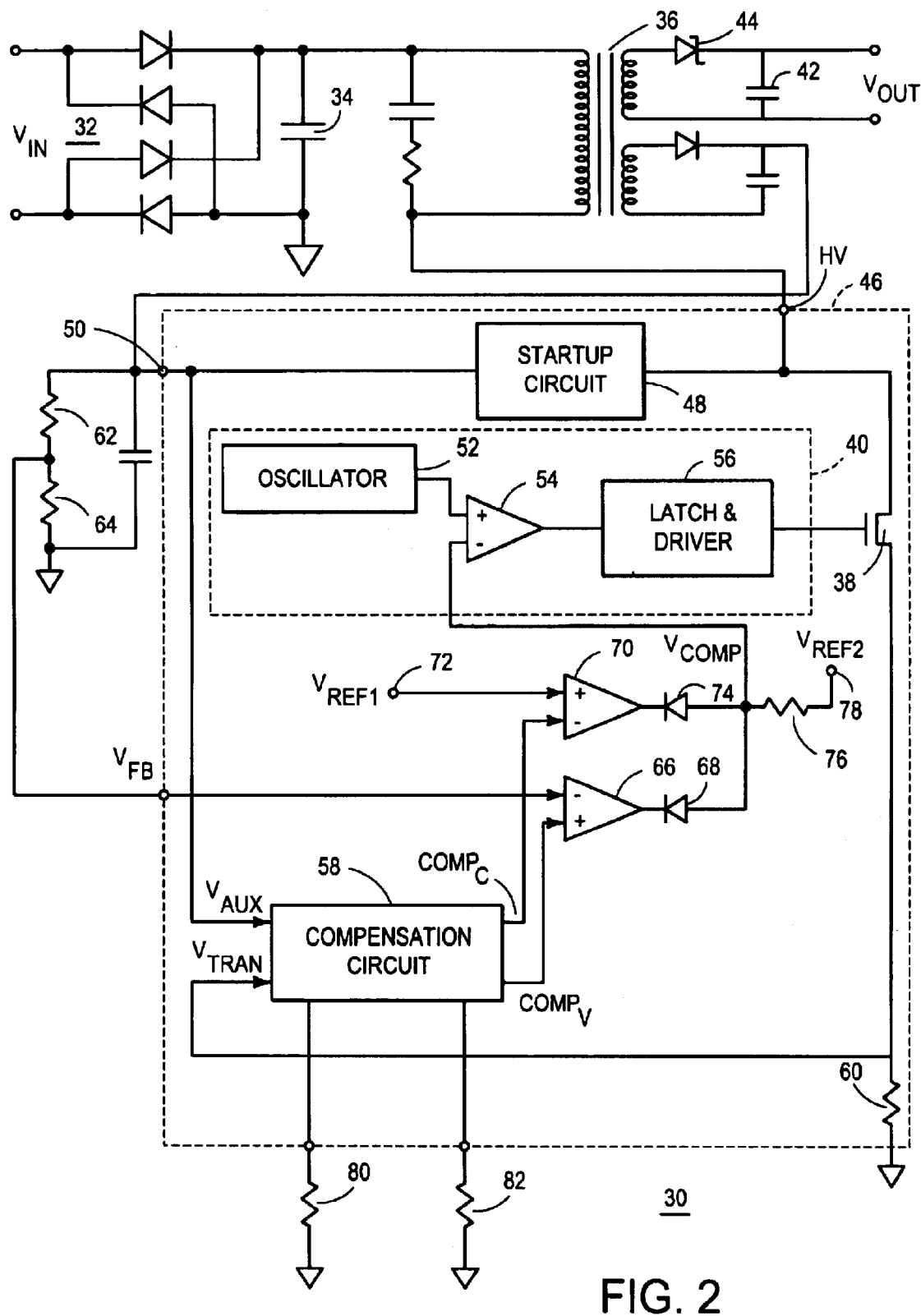
FIG. 2 is a schematic diagram of a switching power supply including a compensation circuit.

FIG. 2 illustrates an embodiment of switching power supply 30. Specifically, switching power supply 30 receives an AC line voltage and converts it to a regulated DC operating voltage. An AC line voltage is converted to a DC bulk voltage by full-wave rectifier diode bridge 32. Capacitor 34 filters the DC bulk voltage, and the primary winding of transformer 36 receives the DC bulk voltage. Power transistor 38 conducts an inductor current through the primary winding of transformer 36, and operates on regulation cycles controlled by regulator circuit 46 to control the amount of energy stored in the magnetic field of transformer 36. When power transistor 38 is non-conductive, the energy stored in the magnetic field is transferred to the secondary winding where capacitor 42 is coupled across the secondary winding to develop DC output voltage $V_{OUT}$. Diode 44 prevents current flow back into the secondary winding.

Regulator circuit 46 monitors and retrieves primary side information from transformer 36 and uses the information from the primary side to approximate the secondary side output current. The approximation provides a constant regulated voltage output to switching power supply 30. Regulator circuit 46 is comprised of the following. Start-up circuit 48 is coupled to power supply terminal 50 to start-up the circuit during start or restart conditions. Start-up circuit 48 can be implemented as in U.S. Pat. No. 5,477,175 which is incorporated herein by reference. High voltage terminal (HV) is connected to the drain of power transistor 38 for coupling to high voltage on the primary winding of transformer 36. Switching regulator circuit 40 is coupled to receive variable compensation signal, $V_{COMP}$ from compensation circuit 58 to provide a drive signal to the gate of power transistor 38. Switching regulator circuit 40 contains the following components. Oscillator 52 generates a fixed frequency sawtooth ramp signal. Comparator 54 compares the fixed frequency sawtooth ramp signal from oscillator 52 to variable compensation signal $V_{COMP}$. The intersection of variable compensation signal $V_{COMP}$ and the fixed frequency sawtooth ramp signal from oscillator 52 determines the duty cycle which controls the switching of power transistor 38. Latch and driver circuit 56 receives the output from comparator 54, and provides a drive signal to power transistor 38.

Compensation circuit 58 generates two compensation signals, $COMP_C$ and $COMP_V$, based on transistor inductor signal $V_{TRAN}$. $V_{TRAN}$ is a current reference signal created by the voltage drop across resistor 60. $V_{TRAN}$ is representative of the inductor current flowing through power transistor 38. Compensation circuit 58 determines compensation signals $COMP_C$ and $COMP_V$ based on $V_{TRAN}$ and the following calculation.

$$I_o = \left(\frac{fL}{2}\right)I^2 = kI^2$$

$$COMP_V = CI_o + V_{D1}$$

$$COMP_C = \frac{COMP_V + V_{D2}}{V_{OUT}}$$

The above calculations relate the secondary output current to the primary side inductor current flowing through power transistor 38 where L is the primary side transformer inductance, f is the switching frequency, $V_{OUT}$ is the output voltage of switching power supply 30, I is the peak primary side inductor current, k is a factor which is representative of switching power supply 30, $V_{D1}$ and $V_{D2}$ are diode voltages, C is a scaling voltage, and $I_O$ is the output current of switching power supply 30.

Compensation circuit 58 receives transistor inductor signal, $V_{TRAN}$ and auxiliary voltage $V_{AUX}$, and generates $COMP_V$ and $COMP_C$ to regulate the voltage and current at the output to switching power supply 30. In typical operation, the output voltage is regulated by compensation signal $COMP_V$. $COMP_V$ is fed to the positive terminal of error amplifier 66 and feedback signal $V_{FB}$ is fed to the negative terminal. Feedback signal $V_{FB}$ can be a fixed signal or a variable signal created by varying resistor 62 and resistor 64. Compensation signals $COMP_C$ and $COMP_V$ can be fixed reference signals, or variable reference signals created by compensation circuit 58. Error amplifier 66 operates in a linear region while switching power supply 30 is operating in a constant output voltage mode. The output of error amplifier 66 drives diode 68 into forward bias and drives variable compensation signal $V_{COMP}$ to switching regulator circuit 40. Switching regulator circuit 40 provides a drive signal to power transistor 38 to regulate the output voltage to switching power supply 30.

$COMP_C$ is a second output from compensation circuit 58 that is fed to the negative terminal of error amplifier 70. The positive terminal of error amplifier 70 receives voltage reference $V_{REF1}$ at terminal 72. During typical operation, the output current to switching power supply 30 is less than the current limit driving error amplifier 70 to high saturation. Diode 74 thus is forced reverse bias effectively removing error amplifier 70 and compensation signal $COMP_C$ from operation. When the output current reaches a maximum current limit for switching power supply 30, the output voltage reduces causing error amplifier 66 to saturate and diode 68 to reverse bias. Error amplifier 66 and compensation signal $COMP_V$ is thus removed from operation. Error amplifier 70 reduces to its linear region of operation driving diode 74 forward bias and effectively compensation signal $COMP_C$ takes over to drive switching regulator circuit 40 with variable compensation signal $V_{COMP}$. Switching regulator circuit 40 switches power transistor 38 and regulates the output voltage of switching power supply 30.

Resistor 76 is connected between the anodes of diode 74 and diode 68, and a second voltage reference, $V_{REF2}$ at terminal 78. Resistors 80, 82 are used as scaling factors for compensation signals $COMP_V$ and $COMP_C$ respectfully.

Figure 3:
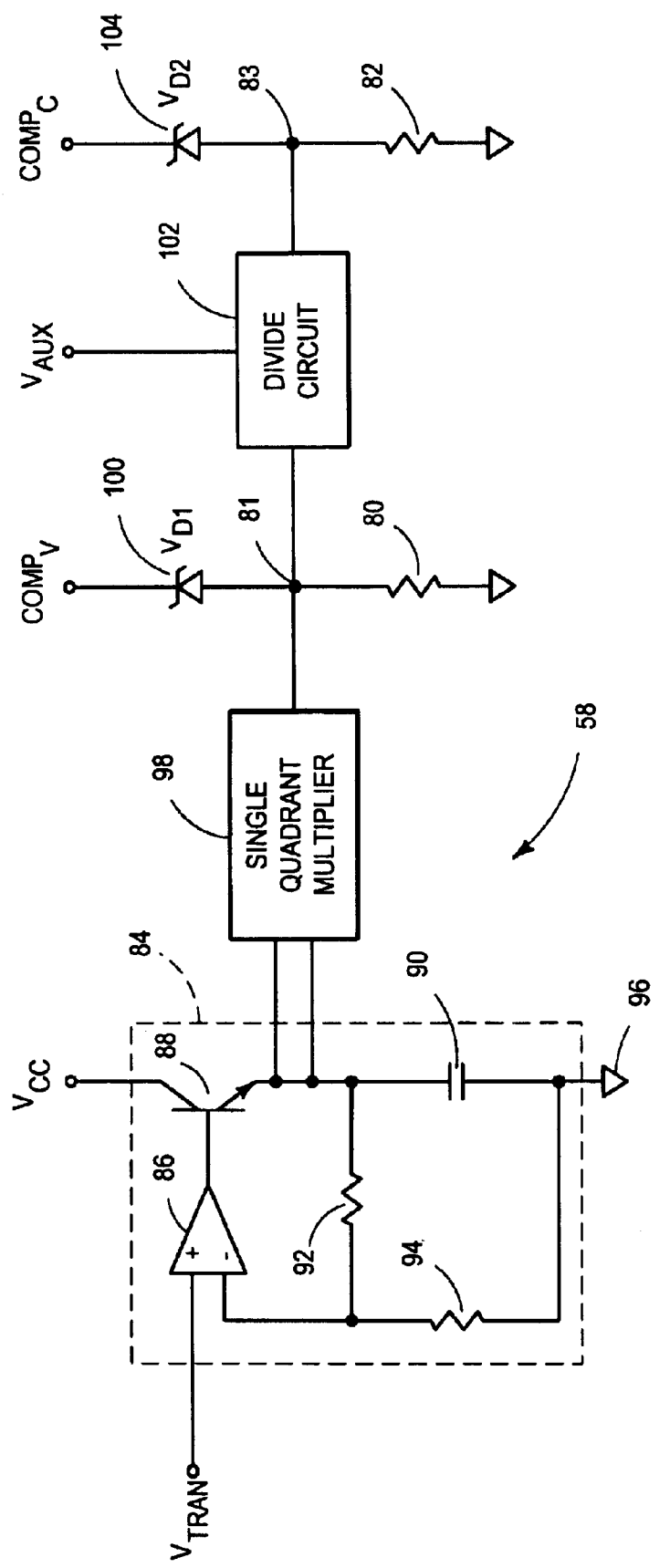
FIG. 3 is a schematic diagram of the compensation circuit included in FIG. 2.

FIG. 3 illustrates compensation circuit 58. Transistor inductor signal, $V_{TRAN}$ is received at the input to compensation circuit 58. $V_{TRAN}$ is a current reference signal representative of the inductor current flowing through power transistor 38. $V_{TRAN}$ is fed into sample and hold circuit 84 where $V_{TRAN}$ is amplified and a DC level signal is established that is proportional to the peak level of the inductor current flowing through the emitter of power transistor 38 (FIG. 2). Sample and hold circuit 84 consist of amplifier 86 having $V_{TRAN}$ fed to the positive terminal, and an output fed into the base of transistor 88. The collector of transistor 88 receives a power supply $V_{CC}$ and its emitter is connected to a terminal of capacitor 90. Capacitor 90 has a second terminal connected to ground potential 96. A terminal of resistor 92 is connected between the negative terminal of amplifier 86 and the emitter of transistor 88. Resistor 94 is connected between the negative terminal of amplifier 86 and ground potential 96. The components capacitor 90, resistor 92, and resistor 94 comprise a feedback loop which couples the emitter of transistor 88 back to the negative terminal of amplifier 86.

The emitter of transistor 88 provides a stored voltage from capacitor 90 which is fed to two inputs of multiplier circuit 98. The output of multiplier circuit 98 is a square of its two inputs. The voltage at the emitter of transistor 88 is a representation of the peak primary side inductor current flowing through power transistor 38. The output of multiplier circuit 98 is connected to resistor 80 and provides compensation signal $COMP_V$. Resistor 80 is chosen to represent output voltage impedance characteristics of switching power supply 30. Diode 100 is connected to the output of multiplier circuit 98 and produces a static voltage reference, $V_{D1}$. The voltage at node 81 is summed with the static voltage reference, $V_{D1}$ to produce compensation signal $COMP_V$. A typical value for $V_{D1}$ is 2.5 volts. Compensation signal $COMP_V$ can be a variable or a constant reference signal at the output to compensation circuit 58. Thus, as the previous equation states, $COMP_V$ is a function of $I_O$ and $V_{D1}$.

While not at current limit, compensation circuit 58 provides compensation signal $COMP_V$ to regulate output voltage $V_{OUT}$, of switching power supply 30. To provide a constant output current to switching power supply 30, divide circuit 102 divides the output to multiplier circuit 98 by an auxiliary output voltage, $V_{AUX}$. The auxiliary output voltage, $V_{AUX}$ represents the output voltage to switching power supply circuit 30. Connected at the output to divide circuit 102 is resistor 82 and diode 104. Resistor 82 is chosen to represent output impedance characteristics of switching power supply 30 and is chosen to scale the output of divide circuit 102. Diode 104 is connected to the output of divide circuit 102 and produces a static voltage reference, $V_{D2}$. The voltage at node 83 is summed with the static voltage reference, $V_{D2}$ to produce compensation signal $COMP_C$. A typical value for $V_{D2}$ is 2.5 volts. Thus, as the previous equation states, $COMP_C$ is a function of $COMP_V$, $V_{D2}$ and $V_{OUT}$.

In typical operation, a decrease in output voltage $V_{OUT}$ to switching power supply 30, results in a transfer of more power from the primary side to the secondary side of transformer 36. The demand for power at the secondary side increases the primary side inductor current flowing through transformer 36, thereby increasing the primary side current flowing through power transistor 38. The increase in primary side inductor current flowing through power transistor 38 increases the transistor inductor signal, $V_{TRAN}$ at the input to compensation circuit 58. $V_{TRAN}$ is fed to sample and hold circuit 84 of compensation circuit 58 as illustrated in FIG. 3. Sample and hold circuit 84 amplifies $V_{TRAN}$ to establish a DC level that is proportional to the peak primary side inductor current flowing through power transistor 38. The output of sample and hold circuit 84 is fed to multiplier circuit 98, whereby a voltage representing the square of the current flowing through transistor 88 is established. The output of multiplier circuit 98 is scaled by resistor 80 to establish compensation signal, $COMP_V$ at the output to compensation circuit 58. When at current limit, amplifier 66 becomes saturated causing diode 68 to reverse bias, effectively removing compensation signal $COMP_V$ from operation. Amplifier 70 falls into a linear region and diode 74 becomes forward bias forcing compensation signal $COMP_C$ into operation providing regulation to the output of switching power supply 30 at current limit.

Thus, the present invention illustrates switching power supply 30 for voltage and current regulation using only primary side information. In response to output voltage variations the primary side inductor current flowing through power transistor 38 changes. The change in primary side transistor inductor current $V_{TRAN}$ is fed to the input of compensation circuit 58 to provide compensation signal $COMP_V$, or compensation signal $COMP_C$ at current limit. Variable compensation signal $V_{COMP}$ is generated by $COMP_V$ or $COMP_C$. A change in $V_{COMP}$ is fed to switching regulator circuit 40 to provide a gate drive signal to power transistor 38. Power transistor 38 conducts an inductor current through the primary winding of transformer 36 in response to the gate drive signal to reduce the $V_{OUT}$ variations of switching power supply 30. At current limit, compensation signal $COMP_V$ is removed from operation and compensation signal $COMP_C$ takes over to provide regulation to switching power supply 30.

What is claimed is:

1. A regulation circuit for use in a power supply, wherein the power supply converts an input voltage to an output voltage by switching an inductor current according to a switching transistor drive signal, the regulation circuit comprising:
   a switching regulator coupled for receiving a variable compensation signal to adjust the switching transistor drive signal; and
   a compensation circuit coupled for receiving a current reference signal representative of the inductor current, a first voltage representing the output voltage, and having a first output providing a current compensation signal, and a second output providing a voltage compensation signal, wherein the current compensation signal and the voltage compensation signal generate the variable compensation signal.

2. The regulation circuit of claim 1 wherein the compensation circuit provides the voltage compensation signal proportional to a square of the current reference signal.

3. The regulation circuit of claim 1 wherein the compensation circuit provides the current compensation signal proportional to a square of the current reference signal divided by the first voltage.

4. The regulation circuit of claim 1 further includes:
   an amplifier having a first input receiving the voltage compensation signal, and a second input receiving a feedback signal; and
   a diode coupled to receive an output from the amplifier to provide the variable compensation signal.

5. The regulation circuit of claim 1 further includes:
   an amplifier having a first input receiving the current compensation signal, and a second input receiving a voltage reference signal; and
   a diode coupled to receive an output from the amplifier to provide the variable compensation signal.

6. The compensation circuit of claim 1 further includes:
   a sample and hold circuit coupled to receive the current reference signal and provide an output signal having a direct current (DC) level proportional to a peak value of the current reference signal;
   a multiplier circuit having first and second inputs coupled to receive the output signal from the sample and hold circuit and an output for providing the voltage compensation signal; and
   a divide circuit coupled to the output of the multiplier circuit and having an output for providing the current compensation signal.

7. The sample and hold circuit of claim 6, further includes:
   an amplifier having a first input coupled for receiving the current reference signal and a second input coupled for receiving a feedback signal; and
   feedback circuitry with an input coupled to receive the output signal and an output coupled to the second input of the amplifier to provide the feedback signal; and
   a transistor having a control terminal coupled to an output of the amplifier, a first conduction terminal coupled to a power supply terminal, and a second conduction terminal coupled to the input of the feedback circuitry.

8. The switching regulator of claim 1, further includes:
   an oscillator;
   a comparator having a first terminal coupled to receive the oscillator signal, a second terminal coupled to receive the variable compensation signal; and
   a latch and driver circuit having an input coupled to an output of the comparator, and an output providing the switching transistor drive signal.

9. The switching regulator circuit of claim 8, further including a transistor having a first conduction terminal coupled to the input voltage, a second conduction terminal providing the inductor current, and a control terminal coupled for receiving the switching transistor drive signal.

10. A method of converting an input voltage to an output voltage in a power supply by switching an inductor current according to a switching transistor drive signal, comprising:
    controlling the switching transistor drive signal in response to a feedback signal;
    generating a voltage compensation signal from a transistor inductor signal representative of the inductor current;
    generating a current compensation signal from the transistor inductor signal and the output voltage;
    providing a variable compensation signal in response to the voltage compensation signal, and the current compensation signal; and
    adjusting the feedback signal in response to the variable compensation signal.

11. The method of claim 10 wherein the voltage compensation signal is proportional to a square of the transistor inductor signal.

12. The method of claim 10 wherein the current compensation signal is proportional to the output voltage and a square of the transistor inductor signal.

13. The method of claim 10, wherein the step of generating the voltage compensation signal further includes:
    generating an output signal having a direct current (DC) level proportional to a peak value of the transistor inductor signal; and
    coupling first and second signals to receive the output signal and provide the voltage compensation signal.

14. The method of claim 13, wherein the step of generating the current compensation signal further includes providing the current compensation signal by dividing the output signal by the output voltage.

15. The method of claim 10, wherein the step of providing further includes comparing the feedback signal to the voltage compensation signal to generate the variable compensation signal.

16. The method of claim 10, wherein the step of providing further includes comparing a voltage reference signal to the current compensation signal to generate the variable compensation signal.

17. The method of claim 10, wherein the step of adjusting further includes adjusting the feedback signal when the voltage compensation signal is held constant, or adjusting the voltage compensation signal when the feedback signal is held constant.

18. A regulator circuit coupled for receiving a current reference signal representative of an inductor current and providing a variable compensation signal, comprising:
    a first comparator having a first input coupling a current compensation signal, a second input coupling a voltage reference signal, and an output providing the variable compensation signal;

a second comparator having a first input coupling a voltage compensation signal, a second input coupling a feedback signal, and an output providing the variable compensation signal; and a compensation circuit coupled for receiving the current reference signal, having a first output providing the current compensation signal, and a second output providing the voltage compensation signal, wherein the current compensation signal and the voltage compensation signal generate the variable compensation signal.

19. The regulator circuit of claim 18, wherein the compensation circuit provides the voltage compensation signal proportional to a square of the current reference signal.

20. The regulator circuit of claim 18, wherein the compensation circuit provides the current compensation signal proportional to a square of the current reference signal divided by an output voltage.

* * * * *